Aug. 15, 1967     A. B. JUDKINS     3,335,437
MOTORIZED FLOAT FOR SUPPORTING PICK-UP TRUCK CAMPERS
Filed Aug. 2, 1966     2 Sheets-Sheet 1
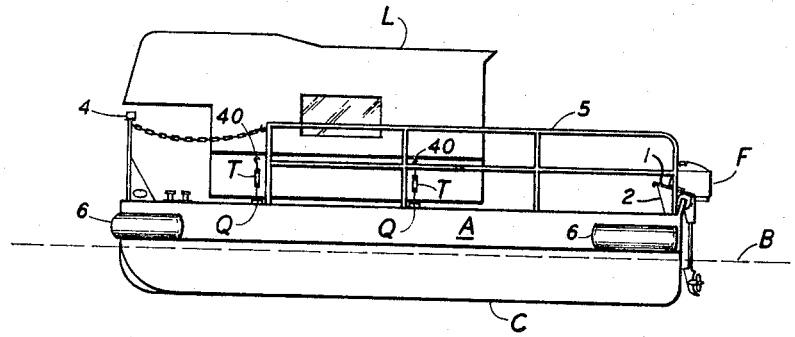
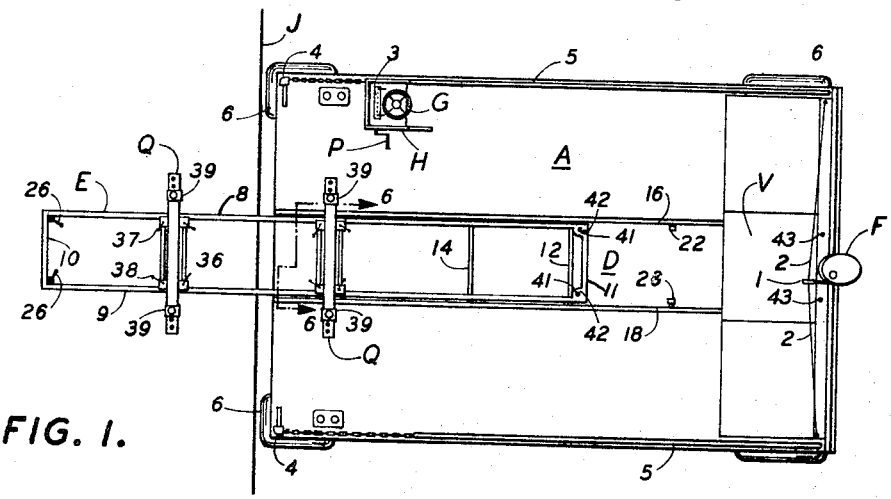
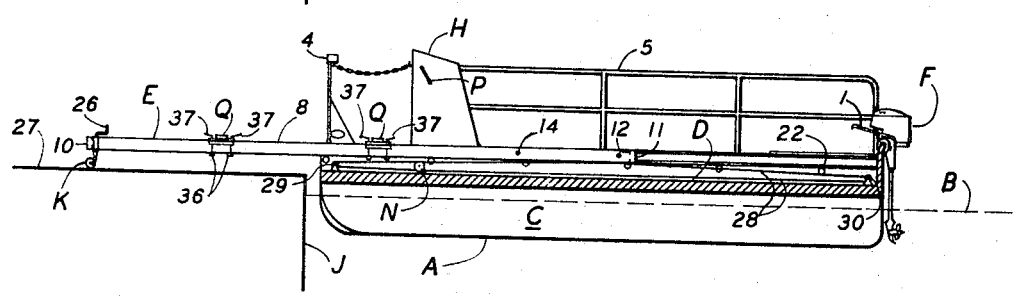
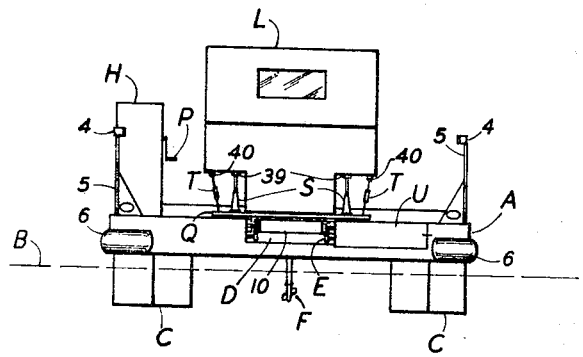
INVENTOR.
ARLAND B. JUDKINS
BY
William R. Piper
ATTORNEY

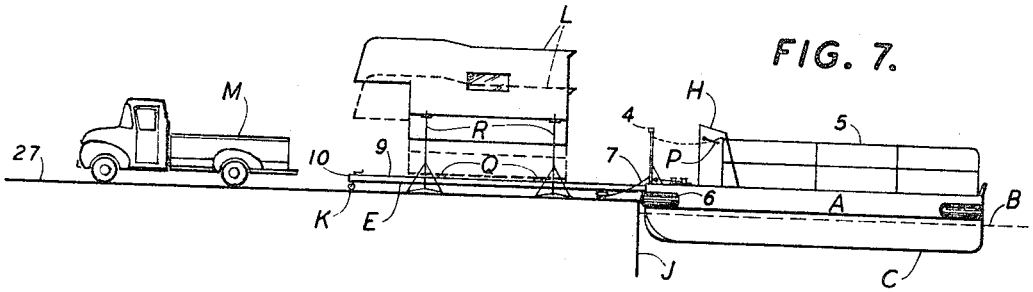
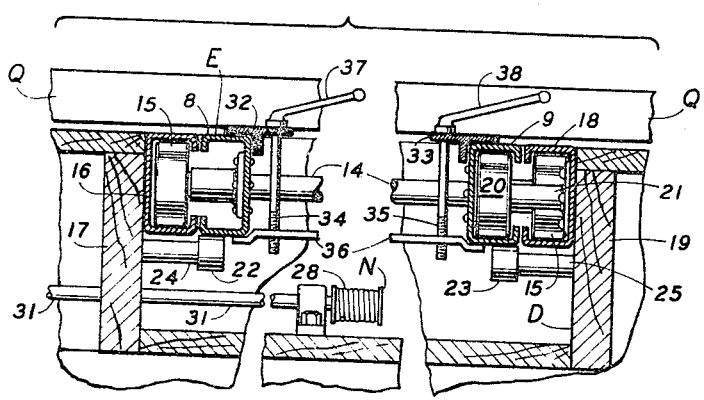
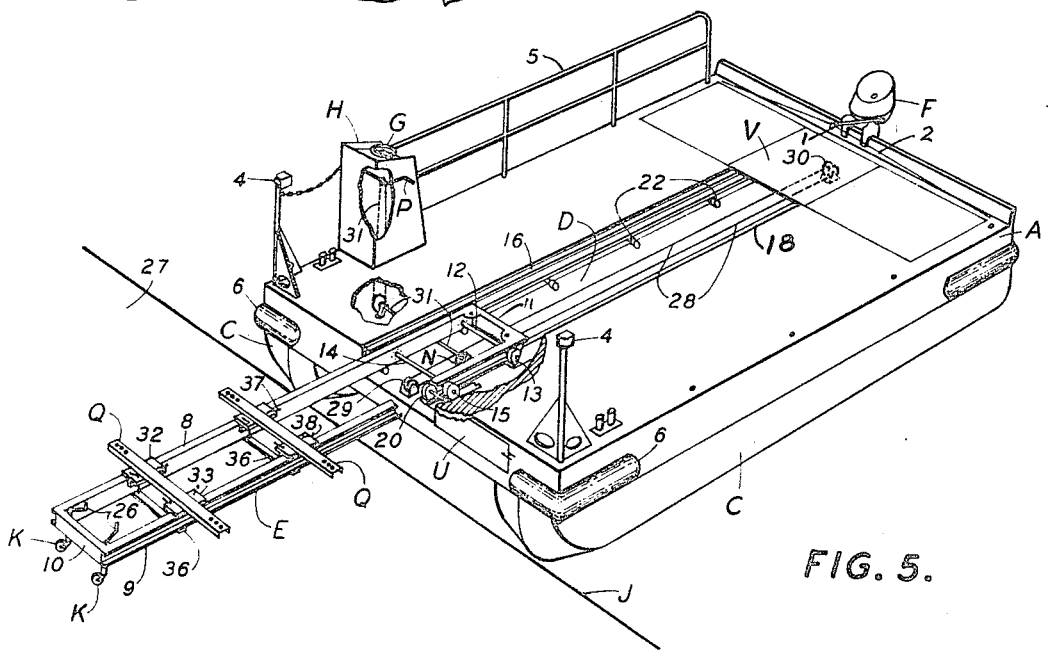

United States Patent Office 3,335,437
Patented Aug. 15, 1967

3,335,437
MOTORIZED FLOAT FOR SUPPORTING
PICK-UP TRUCK CAMPERS
Arland B. Judkins, 466 Luther Road,
Auburn, Calif. 95603
Filed Aug. 2, 1966, Ser. No. 569,672
7 Claims. (Cl. 9—1)

The present invention relates to improvements in a motorized float for supporting pick-up truck campers and it consists in the combination and arrangement of parts hereinafter described and claimed.

An object of my invention is to provide a device of the type described in which a camper supporting carriage can be extended from the deck of the float and have its free end overlie a wharf to which the float is moored, the carriage being adapted to receive and support a camper that has been removed from a pick-up truck. Mechanical or hydraulic jacks are used for lifting the camper off from the pick-up truck and placing it onto the extended carriage. Novel means is used for securing the camper to the carriage after which the extended portion of the carriage is moved back onto the float so that the camper is centered substantially on the float deck.

The float is provided with an outboard motor or other means of propulsion and a steering mechanism is used for guiding the motorized float over the water such as a lake or river. The float has a well that receives the camper supporting carriage.

Other objects and advantages will appear as the specification continues and the novel features of the invention will be set forth in the appended claims.

Drawings

For a better understanding of my invention, reference should be made to the accompanying drawings, forming a part of this application, in which:

FIGURE 1 is a top plan view of the motorized float and the camper supporting carriage and is shown partly extended over a wharf preparatory to receiving a camper from a pick-up truck.

FIGURE 2 is a longitudinal section taken along the line 2—2 of FIGURE 1.

FIGURE 3 is a front elevation of FIGURE 1.

FIGURE 4 is a side elevation of FIGURE 1, and shows the pick-up camper supported by the float.

FIGURE 5 is a perspective view of the motorized float and shows the camper supporting carriage extended onto the wharf preparatory to receiving the pick-up camper.

FIGURE 6 is an enlarged transverse section of the camper supporting carriage and is taken along the line 6—6 of FIGURE 1.

FIGURE 7 is a schematic view illustrating how the camper is transferred from the pick-up truck to the extended carriage on the float.

While I have shown only the preferred form of my invention, it should be understood that various changes, or modifications, may be made within the scope of the annexed claims without departing from the spirit thereof.

Detailed description

In carrying out my invention, I provide a float indicated generally at A in all of the FIGURES 1 to 7 inclusive. The float is buoyantly supported on the water B, by pontoons C, or the like, see FIGURE 3. A well D extends longitudinally along the float A and is centrally disposed between the sides of the float, see FIGURES 1 and 5. Before describing the camper supporting carriage E in detail and how it is slidably supported by the float and moves in the well D, it is best to state first that the float is motorized.

In FIGURES 1 to 5 inclusive, I show an outboard motor F that is pivotally mounted and centrally disposed at the rear of the float A. An arm 1, see FIGURE 1, extends from the motor F and is connected to cables 2 which in turn are operatively connected to a steering wheel G, see FIGURE 5, so that an operator can steer the float as it is propelled over the water by the motor. The steering wheel is supported by a wheel house H which may be disposed on the port side of the float. An instrument panel 3 on the wheel house H can be used to control the operations of the motor F. The float A may be provided with port and starboard lights 4 with a railing 5. Rubber snubbers 6 are placed at the corners of the float and FIGURE 7 indicates tie lines 7 extending from a wharf J to the float for mooring the float.

One form of the camper supporting carriage E is shown in FIGURES 1, 2, 5 and 6. The carriage comprises two spaced apart and parallelly extending channels 8 and 9. The ends of the channels are interconnected by cross channels 10 and 11 to form a frame, see FIGURE 5. The inner end of the carriage frame has a transversely extending axle 12 that carries wheels 13 at its ends. Another transversely extending axle 14 is spaced a short distance from the axle 12 and it has wheels 15 mounted on its ends. The wheels 13 and 15 that are disposed nearest to the carriage channel 8 are rotatably received in a supporting channel 16 that in turn is secured to a wall 17 of the well D, see FIGURE 6. In like manner the other two wheels 13 and 15 that are disposed nearest to the carriage channel 9 are rotatably received in another supporting channel 18 that in turn is secured to the other wall 19 of the well D.

The other end 10 of the carriage E carries adjustable wheels K that are adapted to ride on the wharf J for supporting the free end of the carriage when the latter is extended, see FIGURE 5. Hand operated cranks 26 are used for raising or lowering the wheels K so that the extended portion of the carriage will substantially parallel the top 27 of the wharf. Any means may be used for extending the carriage E over the wharf J for receiving a camper L from a pick-up truck M. The wheels K may be retracted when the carriage E is moved back into the well D of the float A. The hand cranks 26 are illustrated as one means for adjusting the wheels K. Other means may be used if desired.

In FIGURES 5 and 6, I disclose a mechanism for extending the carriage E from the well D for receiving a camper L and then for retracting the carriage back into the well so as to dispose the camper on the float A. An endless cable 28 is connected to the cross channel 11 of the carriage A and is passed around two idler pulleys 29 and 30 that are mounted at opposite ends of the well D. The endless cable 28 has a portion wrapped around a drum N, see FIGURE 6. The drum is mounted on a shaft 31 and this shaft is operatively connected to a hand crank P by means of chain and sprockets 31. It is possible to have a motor drive for the shaft 31 if desired. A rotation of the shaft 31 in one direction will extend the carriage E over the wharf J as shown in FIGURE 5 and a rotation of the shaft in the opposite direction will return the carriage into the well. The wheels 13 and 15 on the carriage E will ride in the channels 16 and 18 to support the carriage and the rollers 22 and 23 will also support the carriage as the latter is moved back into the well. The wheels 15 on the carriage will abut the shafts 21 when the carriage E is fully extended and will prevent any further outward movement of the carriage. Other means may be used for stopping the carriage when the latter is fully extended.

I provide adjustable cross members Q that are supported by the channels 8 and 9 of the carriage E. The cross members may be moved into any desired positions along the channels so as to support the camper L properly on the carriage. In FIGURE 5, I disclose a means for clamping the cross members to the channels 8 and 9. The cross member is mounted on a pair of upper plates 32 and 33 and these plates ride on top of the channels 8 and 9 respectively. Hand rotated shafts 34 and 35 are rotatably carried by the top plates 32 and 33 and they have threaded lower ends received in threaded bores provided in a lower plate 36 that grips the undersides of both channels 8 and 9. The shafts 34 and 35 are provided with radially extending and upwardly inclined integral handles 37 and 38 which may be manually rotate for rotating their threaded shafts and causing the lower plate 36 and the upper plates 32 and 33 to grip the channels 8 and 9 to secure the cross members Q in adjusted position.

Operation

From the foregoing description of the various parts of the device the operation thereof may be readily understood. In FIGURE 7, I show the float A preparatory to receiving the camper L from the pick-up truck M. The float is moored to the wharf J by the ropes 7 and the camper supporting carriage E has been extended to overlie the wharf with the wheels K of the carriage being adjusted to rest on the surface 27 of the wharf and to support the extended end of the carriage so that the entire carriage will be in a horizontal position.

Mechanical or hydraulic jacks R, see FIGURE 7, are placed on opposite sides of the carriage E and lift the camper L from the pick-up truck M after the latter has been driven into a position for straddling the carriage and the cross members Q have been adjusted along the channels 8 and 9 into the proper position for supporting the camper and the handles 37 and 38 have been rotated for clamping the plates 32, 33 and 36 to the channels for securing the cross members in place. Two jacks R are placed on each side of the carriage E and engage with opposite sides of the camper L. The jacks will lower the camper from the full to the dash line position shown in FIGURE 7, where it will rest on the cross members Q. FIGURES 1 and 3 show the cross members as supporting auxiliary hydraulic jacks S and these jacks have top plates 39 that bear against the camper for aiding in supporting it on the cross members Q. Also turnbuckles T, see FIGURE 3, are used and have their upper ends connected to rings 40 that are secured to the camper L and have their lower ends secured to the cross members Q. The turnbuckles may be tightened for securing the camper to the carriage E.

The operator now rotates the crank P or a motor, not shown, may be operated for rotating the drum N. This will cause the endless cable 28 to move the entire carriage E back into the well D and carry with it the camper L. A door U, see FIGURES 3 and 5, may close the open end of the well D and the opposite end has a steel plate V covering it, see also FIGURE 1. The plate V functions as a walk-away from one side of the float A to the other when the float supports the camper L as shown in FIGURE 4. When the carriage E is fully retracted into the well D, it will position openings 41 in lugs 42 that are carried by the cross channel 11, see FIGURE 1, so that they will register with openings 43 in the plate V. Bolts, not shown, or other fastening means, may be inserted in the aligned openings 41 and 43 for securing the carriage E against accidental movement in the well.

The operator may now free the float A with its camper L from the wharf J and start the outboard motor F for moving the float over the water B. The combination of float A with the camper L does away with the necessity of using a house boat when a person desires to travel on water. Moreover all of the equipment for eating and sleeping is already in the camper and can be transferred as a unit from the pick-up truck M to the float A in the manner just described. The reverse steps are followed when transferring the camper from the float back to the pick-up truck.

The floats A can be purchased or rented and where campsites are at a premium adjacent to a body of water because of the lack of available land, additional areas can be provided by the floats and the floats have the added advantage of being motorized so that the occupants can propel them over the body of water for sightseeing and they can be used for camping at any desired and permissible place on the water. Toilet accommodations, not shown, may be provided on the float if the camper L is not so equipped.

I claim:
1. A float for supporting a pick-up truck type camper comprising:
   (a) a platform supported by pontoons and having a well extending lengthwise thereof;
   (b) a carriage receivable in said well when in normal position;
   (c) means in said well for slidably supporting said carriage;
   (d) means for moving said carriage to extend one end beyond said well, the extended portion being adapted to receive a pick-up truck type camper; and
   (e) adjustable means on said carriage for securing the camper to said carriage; said carriage moving means being adapted to move said carriage back into said well, the carriage carrying the camper with it.

2. The combination as set forth in claim 1: and in which
   (a) adjustable supports are mounted on the end of said carriage that is extendable from said well, said supports being adjustable as to height for contacting with a supporting surface underlying the extended carriage end for supporting this end.

3. The combination as set forth in claim 1: and in which
   (a) said carriage includes two spaced apart parallel channels;
   (b) said carriage supporting means including a pair of channels, one channel being disposed adjacent to each of said carriage channels;
   (c) wheels carried by the end of said carriage that remains in said well when said carriage is extended; said wheels being received in the channels in the well; and
   (d) rollers mounted in said well and being adapted to slidably support said carriage channels as said carriage is moved in the well.

4. The combination as set forth in claim 1: and in which
   (a) said adjustable means for securing the camper to the carriage includes transversely extending members mounted on said carriage and adapted to support the pick-up truck type camper; and
   (b) means for securing said transversely extending members in adjusted position on said carriage.

5. The combination as set forth in claim 4: and in which
   (a) adjustable camper supporting means are mounted on said transversely extending members and engage with the camper to aid in supporting it; and
   (b) tie-down means mounted on said transversely extending members and removably securing the camper to said members.

6. The combination as set forth in claim 1: and in which
   (a) a float propelling means is mounted at one end of said float; and
   (b) a float steering means is provided for said float.

7. The combination as set forth in claim 1: and in which
   (a) means is provided for securing said carriage to said float when said carriage is entirely received in said well; and
   (b) a door for closing the end of said well through which said carriage projects when in extended position.

References Cited

UNITED STATES PATENTS 3,091,208    5/1963    Copeland et al. ___ 214—515 X

MILTON BUCHLER, *Primary Examiner.*

T. M. BLIX, *Assistant Examiner.*